Jan. 6, 1925.
R. L. PATE
HOOD AND RADIATOR COVER FOR AUTOMOBILES
Filed June 9, 1921
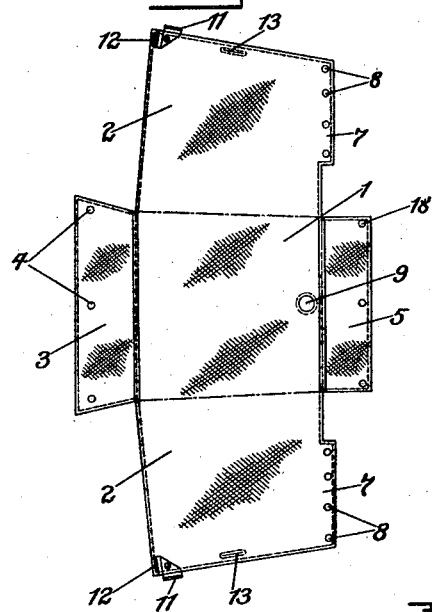
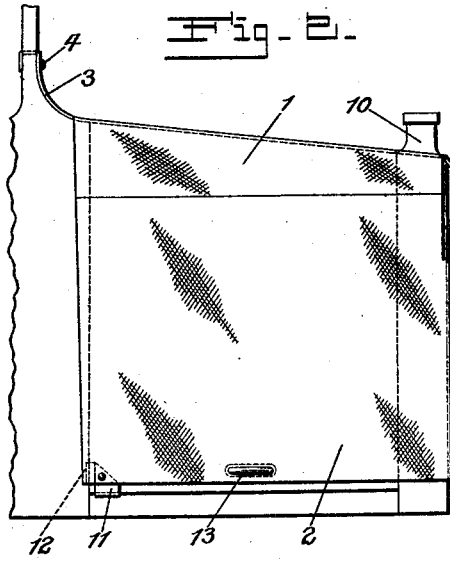
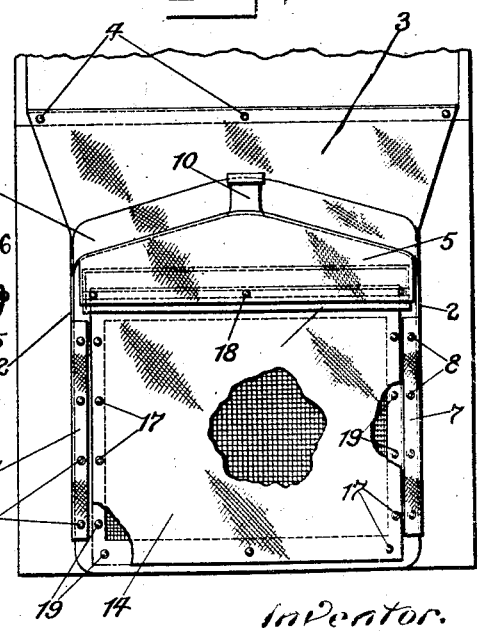

Patented Jan. 6, 1925.

1,522,264

UNITED STATES PATENT OFFICE.

ROBERT L. PATE, OF SPRINGFIELD, MISSOURI.

HOOD AND RADIATOR COVER FOR AUTOMOBILES.

Application filed June 9, 1921. Serial No. 476,323.

*To all whom it may concern:*

Be it known that I, ROBERT L. PATE, a citizen of the United States, residing at the city of Springfield, county of Greene, and State of Missouri, have invented a new and useful Hood and Radiator Cover for Automobiles, of which the following is a specification.

This invention relates to a hood and radiator cover for automobiles.

An object of the invention is to provide an improved hood and radiator cover for automobiles of novel and efficient construction and arrangement, and including means for effectively holding the same in place upon the usual metallic hood and radiator shell.

Another object of the invention is to provide an improved hood and radiator cover for automobiles composed practically of a single piece of material or a number of pieces permanently united, with effective means for releasably holding the cover stretched in position upon the usual metallic hood and radiator shell of the automobile.

Another object of the invention is to provide an improved hood and radiator cover including an extended portion of sufficient length to extend under the windshield of the automobile, and means for holding all parts of the radiator cover in proper position.

Additional objects and advantages of my improved hood and radiator cover will be made apparent from the following description, reference being made to the drawing in which—

Fig. 1 is a plan view of my improved hood and radiator cover in open form.

Fig. 2 is a side elevation showing the invention applied to an automobile.

Fig. 3 is a front view.

The form of the hood and radiator cover as shown open in Fig. 1 and as shown in Figs. 2 and 3 applied to the automobile, comprises a top or central portion 1, the side portions 2 adapted to cover the sides of the hood, and an extended portion 3 of sufficient length to extend under the windshield of the automobile, where it is retained by appropriate releasable fasteners 4.

The forward end of the central portion 1 is provided with an extension 5 arranged to extend downwardly in front of the upper portion of the radiator to a connection with a metallic case or housing 6 in which the radiator curtain is supported as hereinafter explained.

The forward ends of the sides 2 of the cover have extensions 7 arranged to extend around to the front of the sides of the radiator to which said extensions 7 are secured by appropriate releasable fasteners 8. An opening 9 is provided in the central part 1 of the cover to receive the extension 10 through which the radiator is filled.

The lower rear corners of the sides 2 are provided with clips, each of which comprises a lower portion 11 arranged to engage with the lower edge of the metallic hood, and with a vertical portion 12 arranged to engage with the rear edge of the metallic hood. The clips thus engaged with the hood hold the flexible cover stretched when the other fasteners are properly connected, and may be easily disengaged after releasing the fasteners 8 holding the forward ends of the sides of the cover. The sides 2 are also provided with slots 13 receiving the usual handles of the hood, and permitting the present cover to lie close upon the usual hood.

The curtain 14 at the front of the radiator is supported within the case or housing 6 and may be rolled up therein when not in use. When the curtain 14 is rolled up in the housing 6 the entire working area of the radiator is exposed because the extensions 5 and 7 of the cover do not extend to the working area of the radiator. When rolled up in the case or housing 6 the curtain 14 is supported by straps 15 secured at one end to the housing and having releasable connections 16 with the housing 6 at their opposite ends.

The curtain 14, shown in Figs. 2 and 3, may be secured in position in front of the radiator by fasteners 17. As shown, the extension 5 may be held in connection with the housing 6 by fasteners 18. The curtain 14 may be supported in different positions to cover more or less of the working surface of the radiator, as desired. For this purpose the side portions of the radiator and the side edges of the curtain are provided with releasable fasteners 19. By lowering the curtain 14 a part of the way and engaging the proper fasteners 19 the curtain will be supported in a position to cover only a part of the working area of the radiator. Similarly, by lowering the curtain 14 an additional distance and properly engaging the fasteners 19 an additional portion of the working area of the radiator may be kept covered; or, by lowering the curtain all the way, as shown in Fig. 3, the entire working area of the radiator may be kept covered.

From the foregoing it is apparent that my invention completely accomplishes all of its intended objects. The cover is of sufficient area to extend beyond the forward and rear edges of the usual metallic hood and gives better protection than the covers made in separate pieces, or which do not possess the characteristics described. The extension 3 may be used or not as desired, and I do not restrict myself to a construction essentially embodying such extension. The construction and arrangement of my improved hood and radiator cover may be varied in other particulars without departure from the nature and principle of the invention. I do not restrict myself to essential features, nor otherwise, except as set forth in the appended claims, but what I claim and desire to secure by Letters Patent, is:—

1. A device of the character described, comprising a cover extending over the automobile hood and radiator, means for attaching the forward end of the cover directly to the radiator shell, a curtain supported by the radiator below the forward part of the cover, a housing for the curtain forming an integral part of the radiator, and means for holding the curtain within the housing.

2. A device of the character described, comprising a cover extending over the automobile hood and radiator, an extension in connection with the front end of the cover extending downwardly in front of the upper portion of the radiator, fastener devices for holding said extension, an extension at the rear of the cover extending toward the windshield of the automobile, fastening devices for the rear end of said rear extension, means for securing the lower rear corners of the cover to the lower and rear portions of the radiator hood, and means for securing the front edges of the side portions of the cover to the front of the radiator shell.

3. A cover for an automobile hood and radiator, comprising a central portion for covering the top of the hood and the radiator, an extension from the rear end of the central portion extending toward the windshield of the automobile, means for securing the rear edge of said extension adjacent to the windshield, an extension from the forward end of said central portion extending downwardly in front of the upper portion of the radiator, means for securing the lower edge of said second extension in position in front and near the top of the radiator, side portions in connection with said central portion for covering the sides of the hood, means in connection with said side portions for engaging the lower and rear edges of the sides of the hood, extensions in connection with the forward edges of said side portions extending part of the way across the front of the radiator, and releasable means for securing said last-named extensions to the front of the radiator.

4. A device of the character described, comprising a flexible cover extending over the automobile hood and radiator, releasable fasteners for securing the forward end of the cover to the radiator shell, and clips attached to the lower rear portions of the cover arranged to engage the vertical edges of the metallic hood and also arranged to engage the lower horizontal edges of the metallic hood.

ROBERT L. PATE.